United States Patent [19]
Piroska

[11] 3,785,249
[45] Jan. 15, 1974

[54] POWER TRANSMISSION SYSTEM

[76] Inventor: Jozsef Piroska, Kallangsvagen 6, Lidingo, Sweden

[22] Filed: Mar. 28, 1972

[21] Appl. No.: 238,863

Related U.S. Application Data

[63] Continuation-in-part of Ser. No. 5,204, Jan. 23, 1970, abandoned.

[52] U.S. Cl. .............................. 91/41, 60/6, 92/17
[51] Int. Cl. .......................................... F15b 15/26
[58] Field of Search ...................... 60/6; 91/41, 44, 91/45, 420, 443; 92/17, 27, 28

[56] References Cited
UNITED STATES PATENTS

| | | | |
|---|---|---|---|
| 679,421 | 7/1901 | Halsey | 92/17 X |
| 2,660,028 | 11/1953 | Geyer | 91/45 X |
| 2,918,786 | 12/1959 | Geyer | 60/6 |
| 3,026,850 | 3/1962 | Clifton et al. | 60/6 |
| 3,075,503 | 1/1963 | Kimsey | 92/28 X |
| 3,202,060 | 8/1965 | Grotness | 91/443 |
| 3,273,466 | 9/1966 | Baldgh et al. | 91/420 |
| 3,359,862 | 12/1967 | Modrich | 91/45 X |
| 3,372,544 | 3/1968 | Kirkwood | 91/459 X |
| 3,386,340 | 6/1968 | Engle | 92/2 X |
| 3,613,503 | 10/1971 | Phillips | 91/420 |

*Primary Examiner*—Irwin C. Cohen
*Attorney*—Benjamin H. Sherman et al.

[57] ABSTRACT

A power transmission system includes a linear fluid actuator having a cylinder and a piston, a screw rotatably mounted in the cylinder in an axially fixed position and having a threaded connection with the piston wherein there is some play between the threads, and means arranged to rotate the screw in either direction only when the mechanical load on the piston has counterbalance by corresponding force derived from fluid pressure for movement in both directions.

10 Claims, 3 Drawing Figures

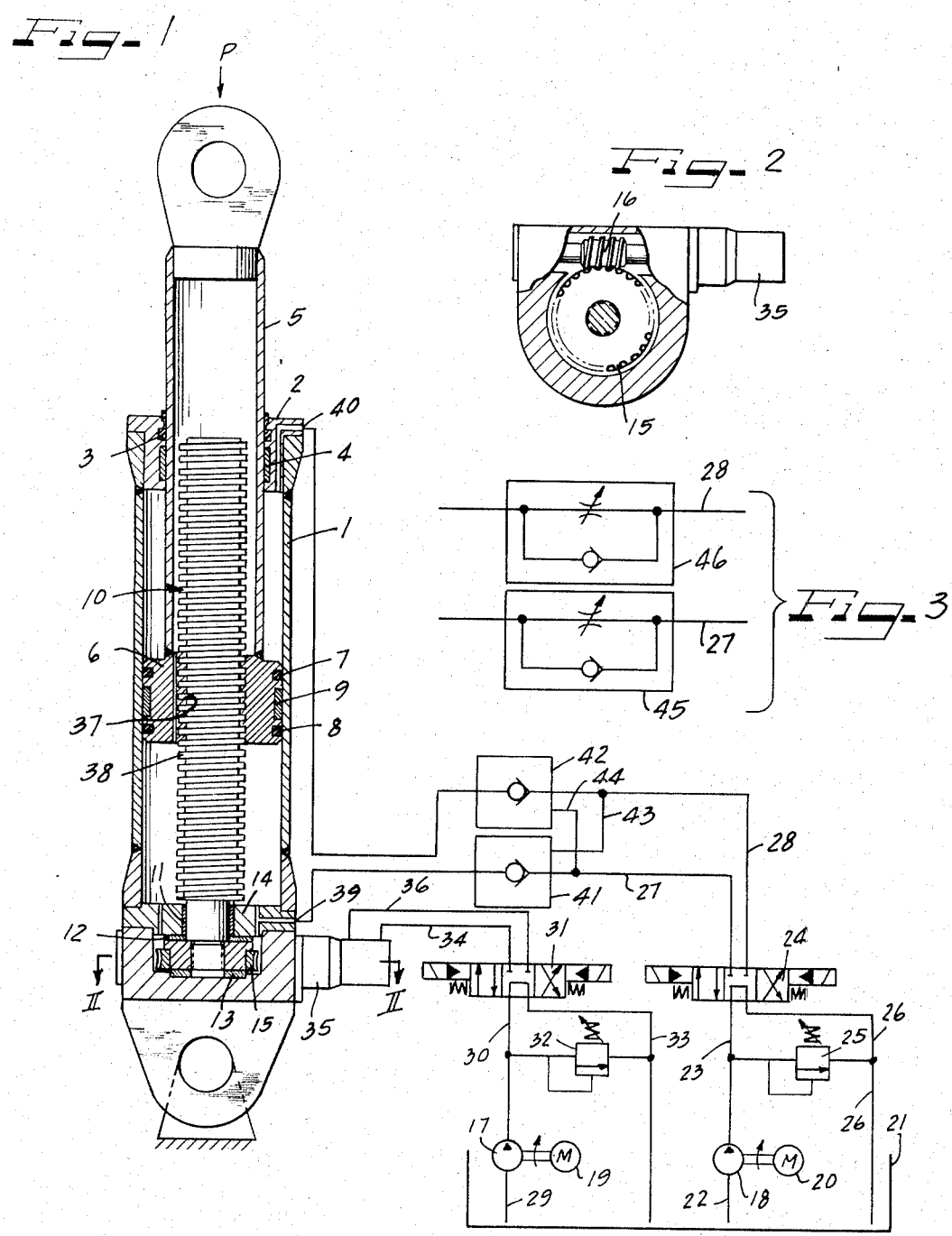

POWER TRANSMISSION SYSTEM

RELATED APPLICATION

This application is a continuation-in-part of my application, U.S. Ser. No. 5,204, filed Jan. 23, 1970 and now avandoned, which in turn is based on Swedish application filed Jan. 24, 1969, Ser. No. 1015/69. A certified copy of the Swedish application was filed in connection with my U.S. application 5,204.

BACKGROUND OF THE INVENTION

1. Field of the Invention

The present invention is directed to a power transmission system which includes a linear fluid actuator having a screw acting between the piston and cylinder of such actuator to lock the axial position of the piston.

2. Prior Art

It has been known heretofore to utilize a driven screw to act between the cylinder and the piston of a linear fluid actuator. For instance, the screw has been driven for the purpose of shifting the piston location, or the piston on being moved had the ability to rotate the screw.

SUMMARY OF THE INVENTION

The power transmission system of the present invention includes threads between the screw and the piston which are of such pitch that no matter how much axial force the piston applies against the screw, even in the absence of fluid, the screw will not rotate. Further, means are provided to rotate the screw and such means has such limited capacity that if there is any axial thrust on the threads from the piston, from either fluid pressure or from a load, in either axial direction, the screw cannot be rotated. Thus the threaded connection will permit the screw to be driven only when the thrust or tension on the piston is exactly counterbalanced by a fluid pressure thereon for both directions of piston movement, whereby during movement of the piston axially, there is never any axial load on the screw.

Accordingly, it is an object of the present invention to provide a power transmission system including a fluid actuator having a piston that will maintain its position relative to the cylinder irrespective of the load on the piston and irrespective of where the piston is disposed within the cylinder.

Another object of the present invention is to provide a power transmission system having an actuator that cannot be displaced as a consequence of loss of pressure fluid.

A still further object of the present invention is to prevent any settling movement of the piston at any time that piston movement has not been called for. Thus neither unfavorable friction conditions or air in the system could cause piston movement.

Many other advantages, features and additional objects of the present invention will become manifest to those versed in the art upon making reference to the detailed description and the accompanying drawings in which a preferred structural embodiment incorporating the principles of the present invention is shown by way of illustrative example.

ON THE DRAWINGS

FIG. 1 is a longitudinal cross sectional view, partly schematic, of a power transmission system provided in accordance with the principles of the present invention;

FIG. 2 is a cross sectional view taken along line II—II of FIG. 1; and

FIG. 3 is a fragmentary schematic view of a modified portion of the fluid circuitry of FIG. 1.

AS SHOWN ON THE DRAWINGS:

This invention is particularly useful when embodied in a power transmission system such as shown in FIG. 1. The system is particularly useful for raising and lowering heavy loads, and as will become more apparent from the description which follows, may be utilized both under compression and under tension. As shown, the system includes a cylinder 1 having an upper end cap 2, a sealing ring 3, a bearing sleeve 4 guiding a hollow piston rod 5 attached to a piston 6, the piston 6 having a set of internal threads 37 and a pair of sealing rings 7,8, and a bearing sleeve 9 for guiding the piston 6 in the cylinder 1. The threads 37 of the piston 6 engage the external threads 38 of a locking screw 10, the locking screw 10 being supported by a number of bearings 11,12 and 13 in a manner that prevents any axial movement of the locking screw 10. At its lower end, the cylinder 1 is closed by means of a lower end cap 14 shown here schematically as being secured to a fixed point. The bearing support for the locking screw 10 is such that the screw can rotate but cannot be displaced axially with respect to the cylinder 1. A gear wheel 15 is corotatably secured to the locking screw 10 and is in constant mesh with a drive screw 16 (FIG. 2), the drive screw 16 being connected to a reversible fluid-pressure drive motor 35, whereby the locking screw 10 can be rotated in either direction.

The threads 37,38 have rather a loose fit axially so that there is provided a substantial axial play therebetween. Moreover, the pitch of these threads 37,38 is such that any force applied from the load P to the piston 6, in either direction, and any force applied to the piston 6 by fluid pressure, in either direction, is incapable of overcoming the friction between the threads 37, 38. Moreover, the power capacity of the fluid drive motor 35 acting through the worm screw 16 and gear wheel 15 on the screw 10 is also incapable of overcoming the friction between the threads 37 and 38. Thus the motor 35 is sized to rotate the screw 10 only when the piston 6 has been moved by fluid pressure so as to place the piston threads 37 intermediate their limits of axial play. In summary then, the rotating means for the screw 10 has a small effective size and is incapable of rotating the screw 10 when there is any load on it, and therefore the screw 10 can rotate only when the piston 6 is displaced to put its threads intermediate the limits of axial play, whereby the load during movement is supported solely by pressure fluid acting on the piston 6.

The work to be done by the power transmission system may be very substantial, while the motor 35, in operating, does no work other than to overcome the friction of the bearings 11—13. The components to control the motor 35 are thus small and the pressures are very low, whereas the opposite is the case as to fluid pressure for the cylinder 1. Therefore, it is impractical to derive the fluid pressure needed for the control motor 35 from the heavy duty system associated with the cylinder 1.

To that end, the hydraulic pump 17 is driven by an electric motor 19 and withdraws hydraulic fluid from a sump tank 21 through a conduit 29, its high pressure side being connected by a line 30 to a four-way control valve 31 which has a return line 33 leading to the sump tank 21. The high pressure port of the pump 17, namely its discharge port, is connected by an adjustable control valve 32 directly to the return line 33. The pump 17 has slightly more capacity than is needed, and the control 32 is thus adjustably set so as to bypass some of the pressurized fluid, thereby limiting the pressure that the four-way control valve can provide at a pair of lines 34,36 leading to the reversible hydraulic motor 35. The control valve 32 thus adjusts the effective size of the means for rotating the screw 10.

A second hydraulic pump 18 is driven by a second electric motor 20 and withdraws pressure fluid through a conduit 22 from the sump tank 21 and discharges through a conduit 23 that is connected to the pressure inlet port of a four-way control valve 24 and which has a return line 26 leading from the return port thereof to the sump tank 21. A control valve 25 is connected between the high pressure line 23 and the return line 26 to return some of the pressurized fluid directly to the sump, and by adjustment of the setting of the control valve 25, the effective size of this portion of the system can be adjusted. With the dual arrangement described, the pressure setting of one control valve 25 has no influence on the setting of the other control valve 32 and vice versa. The actuator ports of the four-way valve 24 are connected by a pair of lines 27,28 to the lower and upper ports 39,40 respectively of the cylinder 1. The control pump 17, while operating at a relatively low pressure, has a relatively high speed capacity, while the power pump 22 can develop somewhat greater forces, the rate of delivery of that portion of the system is effectively a little less. By this arrangement, the rate at which the piston 6 can be displaced when the four-way valve 24 is actuated, if the screw 10 were not present, is a certain rate, while the rate that the control pump 17 can rotate the lock screw 10 if the piston 6 were not present, would be a little higher. Thus for either direction of operation, the threads 38 of the lock screw tend to overtake the threads 37 of the piston 6.

However, if and when the screw 10 does overtake the piston 6, because of the low work capacity to which the rotating means 35 is limited, the screw 10 does not assist the piston 6 to move, but rather would be expected to be stalled by the piston 6 momentarily.

Flow restricting means are provided to ensure that the load on the piston is supported by hydraulic fluid during movement of the piston 6. Preferably, flow restricting means are provided in both of the actuator lines 27,28 and function on the lower pressure side of the piston 6. To that end, a one-way flow restrictor 41 is provided in the line 27 and a one-way flow restrictor 42 is provided in the line 28. The flow restrictor 42 in this embodiment is a pilot operated check valve which readily opens in response to being connected to the pump 22, and which blocks return flow. However, each of the one-way flow restrictors has a pilot line 43,44 connected to the other line 28,27 respectively. The presence of pressure in the line 27 which opens the flow restrictor 41 also partially through the pilot line 44 tends to open the flow restrictor 42 a little bit so as not actually to block flow when there is pressure present in the other line, and the amount of such restriction is selected to achieve the proper coordination of flow rates so as to keep the threads 37,38 axially unloaded during piston movement.

In FIG. 3, there is shown a further type of one-way flow restrictor 45,46. Here a check valve portion blocks return flow and readily opens for fluid flow to the cylinder 1. In parallel to each of the check valves, there is an adjustable orifice device which permits return flow at a controlled rate which bypasses the check valve.

The control valves 25,32 limit the maximum pressure that the pumps 18,17 can respectively provide. When the four-way valves 24,31 are in their central or neutral position as drawn, pressure fluid is returned directly to the sump tank 21. When the valve 24 is moved to the right, the connection between the conduits 23 and 26 is cut off and a fluid connection is established between the conduit 23 and the conduit 27, whereby pressure fluid will flow through the conduit 27 into the cylinder 1 below the piston 6 urging the piston in an upwardly direction, causing fluid above the piston 6 in the cylinder 1 to return through the conduit 28, the valve 24 and the conduit 26 into the sump tank 21. When the valve 24 is set to the left, the piston 6 is urged in the opposite direction.

Similarly, the pump 17 delivers pressure fluid through a conduit 30 to the control valve 31, the control valve 32 being set to a high enough pressure, but not much more than that necessary to rotate the hydraulic motor 35 with no axial load on the locking screw 10. When the valve 31 is in a neutral position, as drawn, fluid flows through the valve and returns through the return conduit 33 and the sump tank 21. When the four-way valve 31 is moved to the right, the connection between the conduits 30 and 33 is cut off and connection is established between the conduit 30 and the conduit 34 whereby the motor 35 can rotate in the absence of any axial load on the locking screw 10. Return fluid from the motor 35 passes through the conduit 36, the valve 31 and the conduit 33. When the spool of the control valve 31 is moved to the left, the drive motor 35 can be rotated in the opposite direction, to thereby rotate the locking screw 10 in the opposite direction.

There are four modes of operation of the actuator. With a downwardly acting load P, there is one mode of operation for lifting the load and a second mode for lowering the load. Similarly, when the load P acts upwardly to place the device under tension, there are both the lowering and the lifting modes of operation.

When the system is utilized to lift a heavy load, such as a heavy damgate, the four-way valve 31 is actuated whereby the motor 35 transmits the torque controlled by the setting of the control valve 32 to the locking screw 10. The force is magnified by the worm 16 and the gear 15. However, the locking screw 10 does not then rotate because of the braking effect of the frictional forces acting on the screw threads 38 which result from the mechanical load on the piston 6. After a short delay, accomplished by means of any well known electric control device, the four-way control valve 24 is actuated so as to introduce pressure fluid through the conduit 27 to the cylinder port 39 to apply a force on the lower side of the piston 6. As the force builds up, it reaches a magnitude wherein the piston 6 is lifted slightly, thus relieving the axial force acting on the screw 10, so that the entire load is supported and lifted solely by the fluid pressure at the lower side of the piston 6. As the load is lifted from the screw threads 38, the screw 10 begins to rotate, thereby permitting the piston 6 to proceed moving in its upward direction. The pumping rate capacity of the pump 17 is in excess of the capacity required for rotating the locking screw 10 exactly in conformity with the rate of displacement of the piston 6, but by setting the control valve 32 appropriately, these two rates can be nicely matched and the excess pressure fluid from the pump 17 being returned by the pressure control valve 32. If the screw 10 should stop rotating, the piston 6 stops its movement as soon as any remaining axial play has been taken up, whereby the piston 6 maintains a firm position in relation to the cylinder 1, such position being assured by the self-locking connection provided by the threads between the piston 6 and locking screw 10. When the piston 6 is no longer urged upwardly, the screw 10 stops rotating, because the available torque for acting on the screw 10 is such that the screw can be rotated only in an unloaded condition, thus assuring that the piston 6 will maintain its position in relation to the cylinder 1 even if all fluid pressure were relieved.

During upward movement, the pressure fluid above the piston 6 is at discharge pressure which is maintained by one of the one-way flow restrictors 42, 46 in the line 28. The locking screw 10 during upward movement is continuously tending to catch up with the piston 6.

In order to move the piston 6 downwardly with a downwardly acting force being applied to the piston 6, the system is operated as follows:

As before, pressure fluid under the control of the four-way valve 31 is delivered through the conduit 36 to the hydraulic motor 35 which transmits a given torque but which is of an opposite rotational direction, through the screw 16, the gear wheel 15 and to the locking screw 10. As before, the locking screw 10 will not rotate due to the braking effect caused by friction resulting from the load at the threads 37,38. After a short delay, pressure fluid is introduced through the conduit 27 into the cylinder 1 below the piston 6 so as to move the piston 6 in a direction opposite to that which it is intended to be moved, namely to raise it. As a consequence, the piston 6 is lifted a short distance corresponding to part of the axial play between the threads 37,38. Thus the axial load on the locking screw 10 is relieved therefrom and thus the screw 10 can rotate in the opposite direction. Once the screw 10 has begun to rotate, the four-way valve 24 is reversed so as now to tend to lower the piston 6 and thus pressure fluid is introduced through the conduit 28 to the upper side of the piston 6 so that the pressure fluid plus the load push the piston 6 downwardly during continuous rotation of the locking screw 10. During this movement, pressure fluid is returned from the lower side of the piston 6 through the conduit 27 and its flow is restricted by the flow restrictor 41 or 45 so as to be at substantially the same rate of flow that the locking screw 10 is in effect turning. Thus during lowering movement under load, the load is in fact supported on a cushion formed by the pressure fluid beneath the piston. Thus the flow restrictor 41,45 controls the speed of downward movement of the piston 6, the screw 10 catching up or tending to catch up with the piston 6 as before, but in the opposite direction. The controlled displacement of the piston 6 is thus obtained through the combined regulation of the discharge flow from the cushion of pressure fluid below the piston and the regulation of the supply of fluid to the annular volume above the piston 6. A relatively lower pressure acts on the upper side of the piston 6 and such lower pressure is about 15 percent of the pressure on the lower side of the piston so as to floatatingly displace the piston in relation to the screw. Restated, the four-way valve 24 is set to pressurize the line 27 so as to initially lift and support the piston 6, and thereafter the control valve 25 is set for lowering and the four-way valve is shifted so as to provide oil pressure through the conduit 28. The pilot operated check valves 41,42 being cross connected, whenever pressure is present in either of the lines 27 or 28, such pressure opens the connected valve on the other conduit partially. These opening pressures can be adjusted so as to get a predetermined pressure relation between the outgoing supply lines 27,28. Now as pressure fluid is supplied through the conduit 28, it will control the opening of the valve in the conduit or line 27 at the relative higher pressure, enabling the desired control displacement of the piston 6 with the piston being supported by pressure fluid for actually supporting the load during lowering.

To lower the piston when the load is one of tension, the principle of operation is the same as when the load is compressive, but the operation is reversed so that the top side of the piston 6 is subjected to operating pressure and the bottom side becomes a discharge side. Thus oil is supplied through the conduit 28 and discharged through the conduit 27, the respective pilot valve in the line 27 being kept open through the pressure in the line 28.

To raise the piston when the load is one of tension, the principle is the same as that for lowering the compressive load. However, in this example, the load is supported by the annular oil volume above the piston 6, forming a cushion. Displacement of the piston 6 upwardly is obtained by supplying oil below the piston at a pressure amounting to about 15 percent of the cushion pressure above the piston.

In order for operation to take place as described, a sufficient or substantial axial play between the threads 37,38 is necessary, thus giving the screw 10 the required time for acceleration in order to maintain a relative floating condition between the screw 10 and the piston 6.

The operation of the one-way flow restrictor 45,46 of FIG. 3 is similar in that the floating condition of the piston 6 and the screw 10 is accomplished by restricting the oil flow in either direction, such restriction being adjustable so as to match operational conditions.

It will thus be seen that in operation, piston movement is obtained solely from fluid pressures acting on the piston 6. The pump 18 and the connected system for the piston 6 is basically a heavy duty system, while the pump 17 and the components connected with it comprise a small light duty system as the screw 10 is rotated only when it is released and thus the motor 35 and the screw 10 are not used to partially or fully shift the piston. The provision of separate fluid systems avoids complicated arrangements for obtaining the operating pressures required and provides the separate operating conditions that are needed.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A power transmission system comprising:
   a. a cylinder including end closures having means to receive pressure fluid at opposite ends thereof;
   b. a piston including opposed pressure responsive faces slidably disposed in said cylinder, having an internally threaded bore therethrough, and having a hollow piston rod extending axially from the cylinder through an end closure at one end thereof for connection at the free end of the rod to a load;
   c. a source of pressure fluid;
   d. selector valve means and flow control means interconnecting said source of pressure fluid with said pressure receiving means at each end of said cylinder and said opposed piston faces, said source and valve means and fluid control means having a flow rate capacity enabling said piston to be displaced by pressure fluid acting thereon at a given rate in either direction;
   e. a screw in said cylinder rotatably mounted in bearings in an axially fixed position with respect to said cylinder at the end opposite to said one end of said cylinder and extending into said cylinder from said bearings, said screw having external threads in engagement with said internal threads of said piston and extendible into said hollow piston rod, said threads having an axial play therebetween and having such pitch and friction that said screw is incapable of rotation in response to any axial force applied thereto by said piston in either axial direction; and
   f. means secured to said cylinder for rotating said screw in a selected direction, said means being continuously engaged with said screw for rotation thereof, said means having an effective size rendering it incapable of rotating the screw in either direction whenever any axial force is extend on the threads of said screw and having a turning rate capacity which is effectively greater than said flow rate capacity for axially displacing the piston, whereby said piston can be displaced when supporting the load in either direction solely by means of fluid pressure acting on said piston, whereas the screw threads follow the displacement of the piston threads without assisting to displace said piston and the screw serving solely for preventing axial displacement of the piston except when such displacement is accomplished by means of said pressure source, valve means and flow control means.

2. A power transmission system according to claim 1 in which said rotating means includes:
   a. a motor-driven pump;
   b. a reversible fluid motor coupled to said screw;
   c. a first four-way control valve connecting said first pump to said first fluid motor; and
   d. adjustable fluid pressure control means coupled to the outlet of said first pump for limiting its outlet pressure for adjusting said effective size of said rotating means.

3. A power transmission system according to claim 2, said selector valve means and said flow control means including:
   a. a second motor-driven pump having an effective size several times greater than that of said first motor-driven pump; and
   b. a second four-way control valve selectively connecting said second pump to either end of said cylinder for urging said piston in opposite directions.

4. A power transmission system according to claim 1, said selector valve means and said flow control means including:
   a. a motor-driven pump;
   b. a four-way control valve selectively connecting said pump to a pair of lines leading to said ends of said cylinder; and
   c. means for restricting the rate of flow through said lines for insuring that the load on said piston is supported on pressure fluid during movement.

5. A power transmission system according to claim 4 in which said flow restricting means are disposed in both of said lines.

6. A power transmission system according to claim 4 in which said flow restricting means acts to regulate the fluid flow from the lower pressure side of said piston for either direction of piston movement.

7. A power transmission system according to claim 4 in which said flow restricting means comprises a 1-way flow restrictor in each of said lines.

8. A power transmission system according to claim 7 in which each said one-way flow restrictor is a pilot operated check valve connected to block return flow and having its pilot connected to the other line for opening such check valve.

9. A power transmission system according to claim 7 in which each said one-way flow restrictor comprises:
   a. a check valve connected to block return flow; and
   b. an orifice device connected to bypass said check valve.

10. A power transmission system according to claim 3, including a second adjustable fluid pressure control means coupled to the outlet of said second pump for limiting its outlet pressure and thereby adjust its effective size.

* * * * *